Sept. 30, 1941.     H. CAMINEZ     2,257,089
STUD DRIVER
Filed Dec. 1, 1939
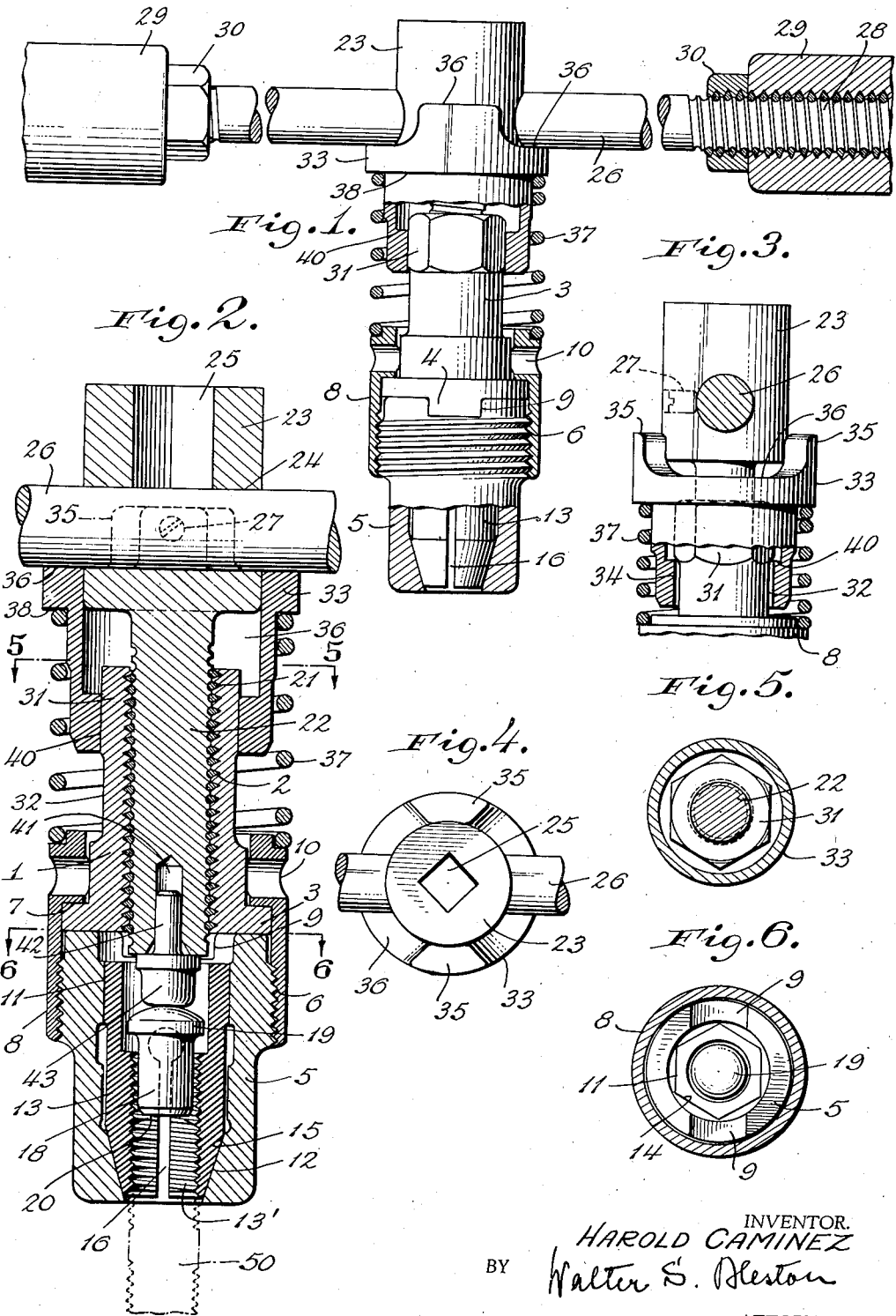
INVENTOR.
HAROLD CAMINEZ
BY Walter S. Hleston
ATTORNEY.

Patented Sept. 30, 1941

2,257,089

UNITED STATES PATENT OFFICE 2,257,089

STUD DRIVER

Harold Caminez, Kew Gardens, N. Y., assignor to Aircraft Screw Products Company, Inc., Long Island City, N. Y., a corporation of New York Application December 1, 1939, Serial No. 307,031

5 Claims. (Cl. 81—113)

The present invention relates to a so-called stud driver which is a tool for screwing a screw stud as, e. g., a cylinder bolt into a threaded hole of a boss or the like. Studs of the type under consideration are generally provided with a lower threaded portion for tight engagement with the boss and with an upper threaded portion to receive thereon a nut or other interiorly threaded member. The invention contemplates to provide a tool which will firmly grip the upper threaded stud portion without injury thereto so firmly that the torque required for screwing the lower portion into the boss may be applied without slippage between the stud and the tool.

A further object of the invention is the provision of a stud driver in which a gripping member may be exchanged for another one so as to make the tool applicable for studs of various diameters; in which the torque required for releasing the stud from the grip of the tool is considerably smaller than that required for fixing the stud; and in which the tool may be readily adjusted to a desired length of the gripped stud portion without requiring the tool to be disassembled for such purpose.

The invention chiefly consists of a main body to which a part adapted to receive therein a collet, chuck or other gripping member, is releasably attached and secured against relative rotation, and into which a threaded shaft is screwed so as to bring about the force required for a tight grip of the chuck or the like and for transmitting to a gripped stud the torque applied to the tool.

The invention further consists of a movable member which has one position essentially in such a relation to the main body and the head of said screw shaft as to permit free rotation of the screw shaft, whereby it may be screwed into and out of the main body, and another position in which it limits the possible rotation of the shaft relatively to the main body to a predetermined arc.

Other objects and details of the invention will be apparent from the description hereinafter and the accompanying drawing illustrating an embodiment of the invention by way of example. In the drawing;

Fig. 1 is a front elevation, partly in section;

Fig. 2 is a longitudinal section of the tool applied to a stud which is indicated in dashed lines;

Fig. 3 is a partial elevation of the upper portion, a member of the tool being shown in a different position;

Fig. 4 is a top elevation;

Fig. 5 is a section along line 5—5 in Fig. 2;

Fig. 6 is a section along line 6—6 in Fig. 2.

Referring now to the drawing, the illustrated embodiment comprises a substantially cylindrical main body 1 with an interior threading 2 and a bottom flange 3. This flange serves for the attachment of a suitably shaped chuck-holder 5. Means are provided for preventing the chuck-holder from rotation relatively to said main body. For this purpose, the flange 3 may have downwardly directed projections or dogs 4 which may engage into recesses 9 of the upper portion of the chuck-holder which is externally threaded at 6. A cap nut 8 bears against the upper face 7 of flange 3 and is screwed on thread 6 of the chuck holder. Lateral holes 10 in the wall of the nut may be engaged by a tool for tightening the nut in order to secure the chuck-holder firmly to the main body 1. The chuck-holder is hollow to receive therein a chuck 13. Means are provided for holding the chuck in the holder against relative rotation, whereas the chuck is free to move a certain extent in axial direction. This may be accomplished as shown in the illustrated embodiment by providing the chuck-holder with an inner hexagonal face 11 and the chuck with an external hexagonal portion 14 of corresponding size. The lower end of the chuck-holder is interiorly cone-shaped at 12, and the lower end 15 of the chuck 13 is accordingly tapered. The chuck is provided with a suitable number of longitudinal slits 16 and with an interior thread 13' corresponding to the threading of a stud 50 to which the stud driver may be applied. Now, it will be clear, that the chuck forced downward in its holder while in engagement with a stud will be compressed owing to the wedging action of the conical surfaces 12 and 15, and thus, tighten its grip on such stud without injury to the stud thread. Furthermore, it will be clear, that chuck-holders with chucks of various sizes, within certain limits, may be used in connection with the same main body 1, and that only the size of nut 8 limits the size of the chuck-holders applicable thereto.

The main body 1 is provided with an interior thread 2, as stated hereinbefore, to receive therein a screw-shaft 22.

In designing the screw connection of shaft 22 and main body 1, one has to take into account that the tool may be subjected to very high stresses. Nevertheless, it should be as little bulky and massy as possible in order to facilitate its manipulation. For this reason, it is recommendable to make the main body as well as the shaft of hardened steel. The danger of the two parts seizing in operation may be avoided by employing an insert of a hard bronze therebetween. Although any suitable kind of threading may be used I prefer to apply a threading as more fully described in my U. S. Patents Nos. 2,150,876 and 2,152,681, because it offers the required qualities, viz. relatively little friction, good bearing properties of the innermating convolutions, and the possibility of repair should the threading be worn by use. The threading under consideration comprises a substantially V-shaped thread groove in the main body 1, of hardened steel into which a wire coil 21 is inserted. The coil wire consists of a hard phosphor bronze and has a cross-section substantially shaped as a triangle on a rounded base, the latter fitting into the thread groove of the screw shaft. The screw shaft 22 consisting also of a hardened steel is provided with a head 23 which may include or embody means for exerting a torque thereto in order to screw a stud to which the tool is applied into a threaded hole of a boss. In the present embodiment such means are so designed as to be easily disassembled if this is required. For this purpose, the head 23 is provided with a transverse bore 24 through which a rod 26 is passed and secured in position by suitable means such as a set screw 27. The ends of the rod are threaded at 28 and handles 29 are screwed thereon and secured thereto by check nuts 30. The screw connections of the rod and handles may be of the same type as mentioned with reference to the screw shaft 22 and the main body 1. A square hole 25 may be machined into the head 23 for the application of a measuring wrench or similar instrument if it is desired to measure the torque while using the tool.

Means are provided for establishing a releasable lost motion connection between the screw shaft and the main body. It is the purpose of such connection, on the one hand, to limit a possible rotation of the shaft in the main body to a pre-determined arc, and, on the other hand, to permit the shaft to be freely screwed in and out of the main body. This is accomplished in the illustrated embodiment in the following manner: A substantially collar-like member 33 is so arranged on the main body 1 that it may be shifted relatively thereto in axial direction. The collar 33 and at least the upper portion 31 of body 1 include or embody means to prevent relative rotation of the two parts. For instance, collar 33 is provided with an internal, and portion 31 with a corresponding external hexagonal cross-section. Underneath portion 31 there may be a cylindrical zone 32 of a cross-sectional size not larger than the circle which may be inscribed in the hexagon of the portion 31. Member 33 is provided with one or several projections 35 extending upward from its upper rim 36. A coil spring 37 bears against a shoulder 38 of the collar 33 and the top of nut 8 so that the upper rim 36 of member 33 is urged against the rod 26. In this position of member 33, the screw shaft may be turned as far as the projections 35 forming lateral abutments for the rod 26 permit, while the hexagonal inner face of member 33 is in engagement with portion 31 of the main body 1. If, however, member 33 is pushed down axially of body 1, as shown in Fig. 3, the rod 26 projecting from the head 23 is free to pass on top of the abutments 35 so that the screw shaft 22 may be freely turned, i. e. screwed in or out, for adjusting the depth to which the screw shaft reaches within the tool. The member 33 may be locked in this lower inoperative position by pushing it down so far that its hexagonal portion 34 is out of engagement with the portion 31 of the main body 1, and then by turning it so that the inner shoulder 40 of the collar 33 bears against the lower faces of the corners of the hexagon 31 which project in relation to the cylindrical portion 32 of body 1. When the collar 33 is turned back or forth until the sides and corners of the two hexagonal faces register, spring 37 will force collar 33 upward into engagement with the rod 26 as hereinbefore described. If in returning the collar to its upper, i. e. its operative position, the same faces of the internal and external hexagon engage each other which were in engagement when the collar was in operative position before it was pulled down, then, the minimum step of adjustment corresponds to a 180° turn of shaft 22 relatively to the body 1. In other words, the increment of the adjustment of the depth to which the shaft reaches within the tool is one half of the pitch of the thread of the shaft. This increment is defined by the fact that in Fig. 4, for instance, in turning the shaft in clockwise direction for adjustment either the right-hand arm of the rod 26 or its left-hand arm can be brought in a position to engage the right-hand edge of the lower lug 35. This increment can be reduced by turning collar 33 relatively to the body 1 when in inoperative position. Owing to the hexagonal cross-section shown in the illustrated embodiment, six different positions of the collar with respect to the body are possible in annular relation. Consequently, the increment of adjustment is reduced to 60° or one-sixth of the pitch of the threading. It will be clear that the device may be provided with means for any desired number of relative positions of the collar. It will be noticed that rotation of the collar relatively to the body is independent of the size of the arc allowed by the lost-motion connection of the shaft and the collar.

In order to protect, against injury, the top of a stud to which the tool may be applied, as will be explained hereinafter, the lower end of the screw shaft 22 is provided with an axial bore 41 into which a pin 42 with head 43 is fitted. Pin head 43 may bear on the head 19 of another pin 18 which is freely movable within the chuck 13. Pin 18 has a flat bottom 20 to contact the top face of a stud whereas the head 19 is preferably rounded. Both pins 42 and 18 are suitably made of a hardened material.

The tool may be assembled in the following manner: First, nut 8 is slipped from the top over the main body 1. Thereafter, spring 37 is placed on the nut, and collar 33 is pushed down and locked in its inoperative position as described hereinbefore. Rod 26 is passed through bore 24 and secured thereto by screw 27; then, the handles are attached to the rod. Thereafter, the screw shaft 22 is screwed into body 1 as far as desired, and collar 33 is turned so as to spring into the position in which it establishes the described lost motion connection between the shaft head and the main body. Now, pin 42 may be inserted from below. The so assembled parts are ready for the attachment of the chuck-holder and chuck selected according to the size of stud which is to be driven. In order to attach these parts the chuck 13 is dropped into the chuck holder 5 so that the hexagonal faces engage each other, and pin 18 is inserted into the chuck. The chuck holder with chuck and pin, then, is pressed against the lower portion of the main body 1 with projections 4 engaging recesses 9, and nut 8 is screwed on the threading 6, whereby the parts are firmly connected to each other.

In applying the stud driver, first either the stud may be slightly screwed into the boss and, then, the stud driver screwed on the upper portion of the stud, or the stud may be first screwed into the tool and, then, brought into engagement with the threaded hole of the boss. When the upper portion of the stud abuts against the bottom 20 of pin 18 and if the play between the pins 18 and 42 and between 42 and the screw shaft 22 is taken up, a torque exerted at the handles 29 will urge the chuck 13 downward into the cone 12 until the force set up by the wedging action and tightening the grip of the slitted chuck on the stud overcomes the resistance offered by the boss to the entering stud. During the turning of the stud driver, the lost motion between the shaft head 23 or, in the present embodiment, the rod 26 and the projections 35 of member 33 will have been taken up so that the torque will be directly transmitted from the rod handles through collar 33 to main body 1 and further through the chuck holder and the chuck proper to the stud gripped by the latter. In order to attain a proper gripping action of the chuck, an adjustment can be had by removing collar 33 from engagement with the shaft head 23 or rod 26, and, then, screwing the shaft 22 in or out of the main body as far as the circumstances require. When the collar 33 is snapped back into engagement the shaft is secured as to the adjustment made, and can be screwed in and out of body 1 only within the limits established by the projections 35.

When the stud is driven into the boss as far as desired, the stud driver can be removed from the stud by turning it in the reverse direction. The reversing torque causes, at first, the shaft 22 to turn relatively to collar 33 and, thus, to the main body 1, until rod 26 abuts against the flanks of the projections 35 opposite to those which were engaged during the driving of the stud. Thereby, the screw shaft 22 will be screwed out of body 1 a short distance so as to remove the axial pressure exercised through pin 18 on the top surface of the stud, and consequently, also the force which wedges the chuck into its holder. Thus, the chuck loosens its grip on the stud and may be easily screwed off the latter by a continued reverse torque exercised at the handles 29.

The tool according to the present invention offers a number of advantages over stud drivers of conventional type. Owing to the fact that the chuck holder, though connected to the main body, is a separate piece it is possible to use the same main body and accessorial parts with chucks of various sizes fitting studs of different diameters. The same fact makes it possible to use a screw shaft 22 of relatively small diameter which may be selected exclusively in consideration of the forces to which it is subjected and regardless of the space required by any other part of the tool. This is important because it is essential to reduce the frictional resistance of the screw shaft in the main body as far as possible so that a minimum reverse torque is required in order to remove the tool from an inserted stud notwithstanding a very high torque being applicable for driving the stud into the threading hole of its boss. In a certain case it has been found that the maximum reverse torque required by my tool was only about 25% of the torque with which a tight fitting stud has been driven into its boss; whereas, a reverse torque of more than 75% was required by a conventional stud driven under similar circumstances. Another vital advantage of the new stud driver is its adjustability as hereinbefore explained.

Various changes and modifications of the form shown and described may be made within the scope of the claims without departing from the spirit of the invention.

I claim:

1. A stud driver comprising in combination an interiorly threaded body, a chuck holder releasably attached to said body and provided with an interior conical surface, a slitted chuck in said holder adapted to be compressed by said conical surface upon its axial movement relatively to said holder, a headed screw shaft in engagement with the thread of the body and adapted to exert an axial pressure upon a stud engaged by said chuck to cause thereby compression of said chuck, a collar-like member axially movable relatively to said body, the top portion of said body and the bottom portion of said member embodying intermeshing means to prevent said member from rotation relatively to said body, the head of said shaft and the top of said member including abutments to prevent said head from rotation beyond a pre-determined arc relatively to said member.

2. A stud driver as claimed in claim 1 further comprising a spring bearing against said member and tending to urge it upward into engagement with said head of said shaft.

3. A stud driver comprising in combination an interiorly threaded body, a chuck attached to said body, a screw shaft engaging the thread of said body and adapted to exert an axial pressure on a stud engaged by said chuck thereby causing a firm grip of said chuck on said stud, a movable member having an operative and an inoperative position, said member and said body including first co-operative means to couple them against relative rotation, and said member and said shaft including second co-operative means constituting a lost-motion connection between said member and said shaft so as to limit their relative rotation to a predetermined arc when said member is in operative position, said second means being disengaged when said member is shifted into inoperative position.

4. A stud driver comprising in combination an interiorly threaded body, a chuck attached to said body, a screw shaft engaging the thread of said body and adapted to exert an axial pressure on a stud engaged by said chuck thereby causing a firm grip of said chuck on said stud, a substantially radial projection of said shaft at its free end, a member arranged on said body and including an abutment for said projection to prevent said head from rotation beyond a predetermined arc relatively to said member, said member and said body including co-operative portions with a plurality of coupling faces so as to couple against relative rotation said member to said body selectively in one of a plurality of positions angularly spaced from each other in annular relation.

5. A device as claimed in claim 4 wherein said member is axially shiftable on said body into operative and inoperative positions, further comprising a spring bearing against said member so as to urge it into operative positions, and means in connection with said body and said member to lock the latter releasably when it is shifted into its inoperative position.

HAROLD CAMINEZ.